United States Patent [19]
Berry

[11] 3,915,464
[45] Oct. 28, 1975

[54] FULCRUM DEVICE

[76] Inventor: William Berry, 84-05 108th St., Richmond Hill, N.Y. 11418

[22] Filed: July 29, 1974

[21] Appl. No.: 492,647

[52] U.S. Cl. .................................... 279/37; 85/5 N
[51] Int. Cl.² ......................................... B23B 5/22
[58] Field of Search ............ 279/35, 36, 37, 38, 39, 279/40; 85/5 N, 8.9, 8.1, 1.5

[56] References Cited
UNITED STATES PATENTS

| 824,526 | 6/1906 | Coffin | 85/5 N |
|---|---|---|---|
| 1,131,990 | 3/1915 | Bocorselski | 279/36 |
| 2,266,659 | 12/1941 | Robinson et al. | 279/37 |
| 3,748,941 | 7/1973 | Richards | 85/5 N X |

Primary Examiner—Frank T. Yost
Assistant Examiner—W. R. Briggs
Attorney, Agent, or Firm—Allison C. Collard

[57] ABSTRACT

A fulcrum device for use on an automatic screw machine which has a cylindrical housing including a pair of longitudinal recesses disposed on opposite surfaces of the housing and a pair of chuck levers each pivotably disposed in the longitudinal recesses. A cylindrically shaped chuck lever pivot pin is disposed across each longitudinal recess of the fulcrum to pivotably retain each of the chuck levers. The head of the fulcrum pins include enlarged shoulders and a tapered portion adjacent to the shoulder with a slot formed in the tapered portion. A set screw which is threadably coupled to the fulcrum is disposed for contact with the tapered slotted portion so that after the chuck lever pin is inserted into the fulcrum to retain each of the chuck levers, the set screw can be backed against the tapered portion at the head of the pin in place. At the opposite end of the pivot pin is a limit pin which is disposed transverse to the axis of the pivot pin and is designed to prevent any portion of the pivot pin from becoming disengaged from the fulcrum if the pivot pin should accidentally become fractured.

4 Claims, 4 Drawing Figures

FULCRUM DEVICE

This invention relates to an improved fulcrum device for use in automatic screw machines.

More specifically, this invention relates to a fulcrum device which has a pair of pivotable chuck levers which control a collet chuck for engaging lengths of rod or pipe as they are fed into an automatic screw machine.

Automatic screw machines which are well known in the prior patented art have a hollow work spindle into which is fed metal bar stock or pipe so that symmetrically shaped parts can be cut as the spindle is rotated. Thus, parts such as screws, valve bodies, studs, and set screws can be turned at the output of a collet chuck. The fulcrum device is secured within the spindle of the automatic screw machine so that it will rotate and actuate the opening and closing of the collet chuck. The fulcrum device includes two chuck levers which are pivotably mounted in the fulcrum. The ends of the chuck levers are tapered so that a chuck lever sleeve which slides over the fulcrum can engage the tapered ends of the levers forcing the tapered ends of the levers to pivot toward the axis of the spindle. At the other end of each lever is a shoulder which engages a chuck lever extension which moves longitudinally a small increment in distance along the length of the spindle to engage the tapered ends of the collet so that the jaws of the collet chuck will close and clamp the workpiece.

After the workpiece is turned and cut off, a feed tube within the spindle retracts and advances the workpiece a predetermined length before the jaws of the collet chuck are closed to grip the workpiece. The collet chuck serves not only to grip the workpiece but to turn it while various tools are used to shape or form the metal on the machine.

Conventional fulcrum devices use chuck lever pins which are tapered and frictionally engage within the fulcrum device. The lever pins eventually wear so that the fulcrum has to be removed from the machine in order to drive out the tapered pins so that replacement pins can be inserted. These conventional fulcrum devices using tapered pins have been found to be difficult to maintain since the tapered pins are hard to install since the tapered hole must be hand reamed to fit the tapered pin. Upon removal, the tapered pin can not be reused.

Accordingly, the present invention provides an improved fulcrum which eliminates the use of tapered pins and uses cylindrical lever pins in combination with holding devices for maintaining the pin in the fulcrum during the operation of the machine. The head of the pin is provided with a shoulder having a tapered forked end so that a set screw can be backed into the tapered forked end with a conventional wrench to secure the lever pin within the fulcrum. Disposed at the opposite end of the lever pin is a limit pin mounted transverse with respect to the axis of the lever pin so that if the shoulder or any portion of the pin fractured, the pin would still be retained within the fulcrum during the operation of the automatic screw machine. The inventive combination of holding devices for the chuck lever pins permits the pins to be easily removed so that the chuck levers and the pins can be replaced for maintenance purposes.

It is therefore an object of the present invention to provide an improved fulcrum device for use in automatic screw machines which permits the easy maintenance and replacement of its chuck levers and its lever pins.

It is another object according to the present invention to provide an improved fulcrum which is simple in design, easy to manufacture, and reliable in operation.

Other objects and features of the present invention will become apparent from the following detailed description considered in connection with the accompanying drawing which discloses the embodiments of the invention. It is to be understood however that the drawing is designed for the purpose of illustration only and not as a definition of the limits of the invention.

In the drawing wherein similar reference characters denote similar elements throughout the several views.

Figure 1:
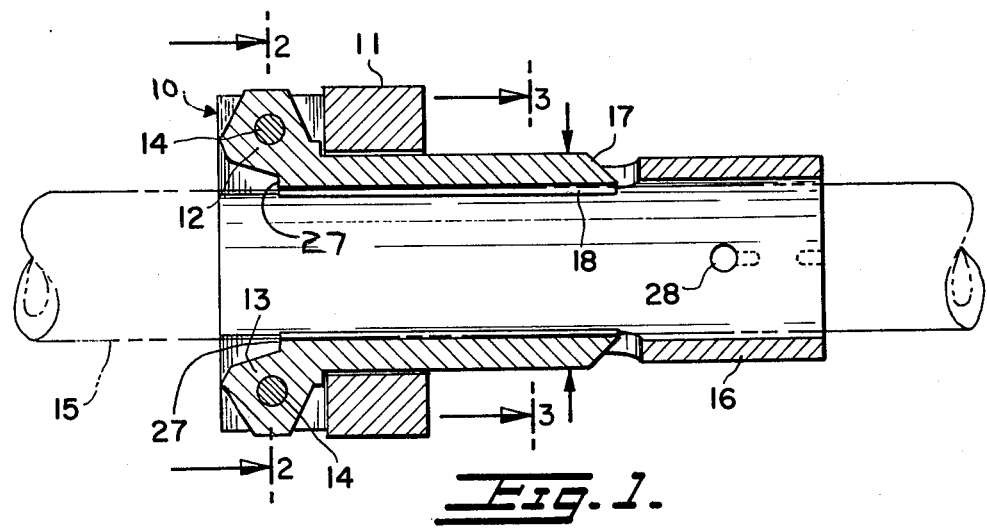
FIG. 1 is a cross sectional view of a fulcrum device shown surrounding a tubular workpiece.
Figure 2:
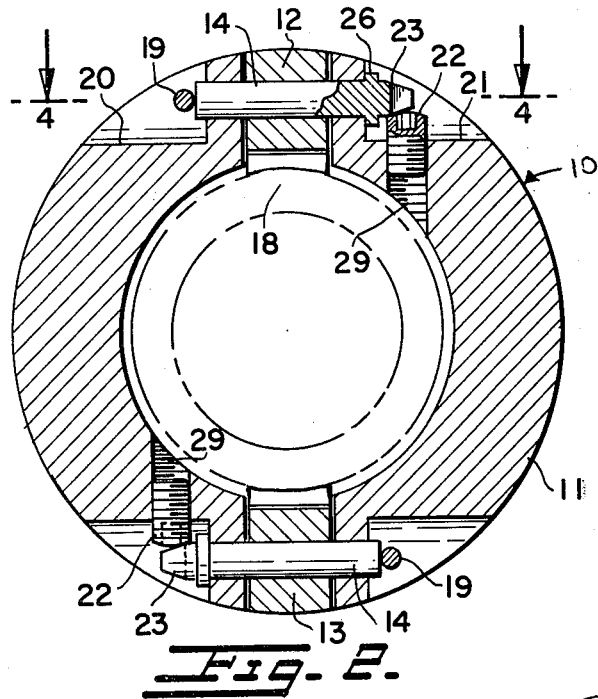
FIG. 2 is a cross sectional view taken through section 2—2 of FIG. 1.
Figure 3:
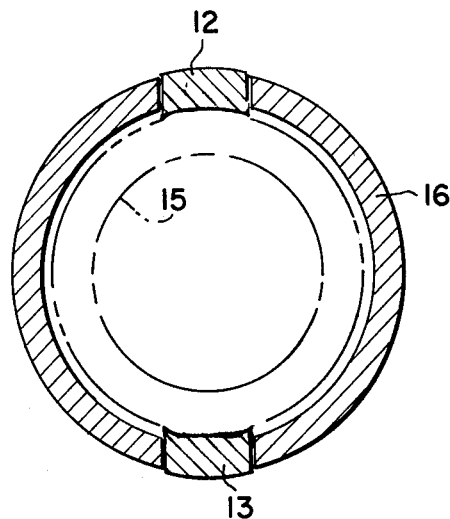
FIG. 3 is a cross sectional view taken through section 3—3 of FIG. 1.
Figure 4:
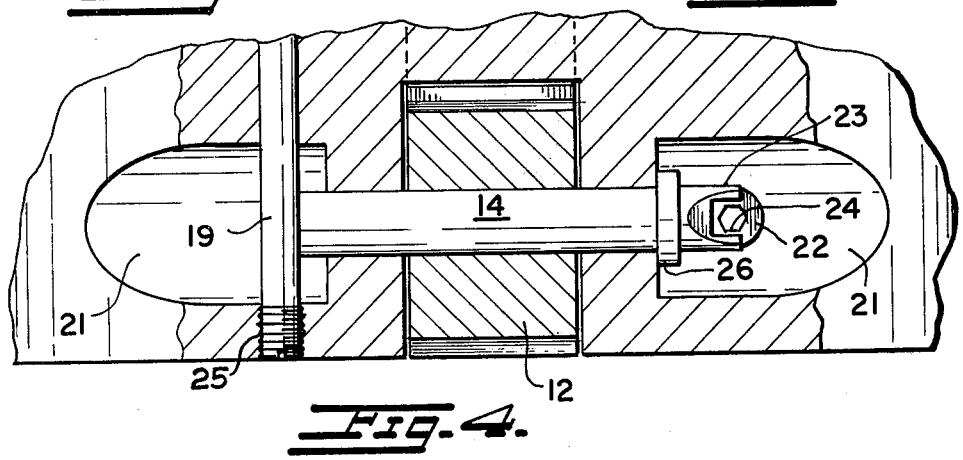
FIG. 4 is a cross sectional view in detail taken through section 4—4 of FIG. 2.

Referring to FIGS. 1-4 there is shown a fulcrum 10 having an enlarged cylindrical portion 11 at one end and an extending cylindrical portion 16 integrally formed therewith. Both portions include a hollow bore so that a workpiece such as a pipe or bar stock 15 can pass through the fulcrum when it is mounted in the spindle of an automatic screw machine. The fulcrum includes a pair of opposed chuck levers 12 and 13 which pivot on chuck lever pins 14 which are retained in longitudinal recess in the main body of the fulcrum. Pins 14 are cylindrically shaped rather than being tapered as in conventional fulcrums, and include a shoulder 26 formed in their head portion as shown in detail in FIG. 2. Adjacent to shoulder 26, the head portion includes a converging taper 23. The tapered head of pin 14 includes a square-shaped slot which exposes the hexagonal opening 24 of a set screw 22, which is threadably engaged by means of threads 29 through the surface of recess 21. Set screw 22 can then be raised above the surface of recess 21 so as to engage the inclined portion of taper 23 thereby urging pin 14 against the body of fulcrum 10.

Disposed at the opposite end of pins 14 are limit pins 19 which are inserted transverse with respect to the axis of pins 14 in the body of fulcrum 10. Transverse limit pins 19 are preferably threadably engaged by means of threads 25 into one portion of the enlarged circumference 11 of the fulcrum and engage the end of lever pins 14 so that if the lever pins fracture, transverse limit pins 19 would prevent any portion of lever pins 14 from becoming loose within the spindle.

In operation, fulcrum 10 is inserted into an automatic screw machine so that a chuck collet sleeve (not shown) slides over cylindrical end portions 16 to engage incline/surfaces 17. This causes chuck lever 12 to pivot clockwise and chuck lever 13 to pivot counter-clockwise as the sleeve engages tapered portions 17. At the other end of each lever is a shoulder 27 which engages a chuck lever extension (not shown) so that as the chuck levers pivot, the extension is urged along the axis of the spindle a small increment in distance so as to engage the tapered ends of the collet chuck. The jaws of the collect chuck will thus close and clamp the workpiece.

Chuck lever pivot pins 14 are preferably constructed slightly smaller than their corresponding bores formed in the enlarged cylindrical portion 11 of the fulcrum so that they can be easily inserted or removed. Likewise, pins 14 are also slightly smaller in diameter than each of the lever bores to permit the levers to freely pivot when actuated by the chuck collet sleeve. The slotted opening formed in the tapered heads 23 of each of the pins is slightly larger than hexagonal bore 24 in set screws 22 so as to permit an Allen head wrench to be inserted through the bore to adjust the set screw. A similar Allen head bore can be formed at the threaded end of transverse pin 19 to permit its easy removal if necessary.

Each of the chuck lever pins can be easily removed by inserting an Allen head wrench into hexagonal opening 24 of set screw 22 and rotating the set screw so that it will move into the surface of recess 21 in order to clear shoulder 26 of the lever pin. The pin can then be easily removed by hand, or by a pair of pliers and replaced. This is an easier method of replacing the pins than in conventional fulcrums where the pins are tapered and have to be driven out with a hammer and a mandril type tool.

While only a few embodiments of the present invention have been shown and described, it will be obvious that many changes and modifications may be made thereunto without departing from the spirit and scope of the invention.

What is claimed:

1. A fulcrum device for use on an automatic screw machine having a cylindrical housing including longitudinal recesses disposed on opposite surfaces of the housing, a pair of chuck levers each pivotably disposed in the longitudinal recesses, the improvement comprising:

a cylindrically shaped chuck lever pivot pin disposed across each longitudinal recess of the fulcrum and pivotably retaining each of said chuck levers;

said chuck lever pivot pin includes an enlarged shoulder formed adjacent one end thereof, a tapered portion formed adjacent to the shoulder at said one end, and a slot formed in the tapered portion, and means for retaining the pivot pin within the fulcrum comprising a set screw threadably coupled in said fulcrum and extending substantially perpendicularly to the axis of said pivot pin and having a curved end contacting the tapered portion of each chuck lever pin.

2. The fulcrum as recited in claim 1 wherein said retaining means additionally comprises a transverse limit pin disposed at the opposite end of said chuck lever pin and transverse to the axis thereof as well as transverse to the axis of said set screw.

3. The fulcrum as recited in claim 2 wherein said transverse limit pin is threadably engaged to the body of said fulcrum.

4. The fulcrum as recited in claim 1 wherein said set screw includes a hexagonal opening in said curved end for receiving an Allen head wrench, said opening being slightly smaller than said slot formed in said tapered portion of said chuck lever pivot pin so that the hexagonal opening is accessible through the slot by the Allen head wrench.

* * * * *